US012641097B1

(12) United States Patent
Dudu et al.

(10) Patent No.: US 12,641,097 B1
(45) Date of Patent: May 26, 2026

(54) SYSTEM AND METHOD FOR DECENTRALIZED ENDPOINT DETECTION AND RESPONSE

(71) Applicant: REASON CYBERSECURITY LTD, Tel Aviv (IL)

(72) Inventors: Yaniv Dudu, Tel Aviv-Jaffa (IL); Andrew Joseph Newman, Franklin Lakes, NJ (US)

(73) Assignee: REASON CYBERSECURITY LTD, Tel Aviv (IL)

( * ) Notice: Subject to any disclaimer, the term of this patent is extended or adjusted under 35 U.S.C. 154(b) by 0 days.

(21) Appl. No.: 19/272,144

(22) Filed: Jul. 17, 2025

(51) Int. Cl.
  *H04L 9/40* (2022.01)
  *G06F 16/245* (2019.01)

(52) U.S. Cl.
  CPC ........ *H04L 63/1416* (2013.01); *G06F 16/245* (2019.01)

(58) Field of Classification Search
  USPC .......................................................... 726/23
  See application file for complete search history.

(56) References Cited

U.S. PATENT DOCUMENTS

| | | | | |
|---|---|---|---|---|
| 2018/0121654 | A1* | 5/2018 | Bobritsky | G06F 16/245 |
| 2019/0166227 | A1* | 5/2019 | Becker | G06F 8/60 |
| 2020/0119557 | A1* | 4/2020 | Claessens | H02J 3/28 |
| 2020/0146550 | A1* | 5/2020 | Tunnell | H04L 65/4015 |
| 2022/0004539 | A1* | 1/2022 | De Caro | H04L 9/0637 |
| 2023/0109926 | A1 | 4/2023 | Nair et al. | |
| 2024/0370001 | A1* | 11/2024 | He | G05B 19/41875 |
| 2025/0138910 | A1* | 5/2025 | Gulati | G06F 40/35 |
| 2025/0139055 | A1* | 5/2025 | Spungin | G06F 16/144 |
| 2025/0286899 | A1* | 9/2025 | Shriver | H04L 63/1416 |

FOREIGN PATENT DOCUMENTS

| | | | |
|---|---|---|---|
| CN | 119994813 A * | 5/2025 | |
| WO | 2022114689 A1 | 6/2022 | |
| WO | 2024228181 A1 | 11/2024 | |

* cited by examiner

*Primary Examiner* — Sakinah White Taylor
(74) *Attorney, Agent, or Firm* — Ballard Spahr LLP

(57)     ABSTRACT

The presently disclosed subject matter includes a system and method for decentralized endpoint detection and response (EDR) that enables scalable, relevance-driven security monitoring across large endpoint populations. Each endpoint locally processes security queries and generates a compact Lightweight Local Response (LLR) indicating whether a local result (LR) is relevant. Full LRs are transmitted only when their associated LLRs are confirmed by the system, reducing bandwidth, storage, and processing overhead. A dynamic batch cycle mechanism controls query distribution, allowing some queries to scale broadly while directing others to selected endpoints based on metadata. Query execution continues across batches until a batch termination condition (BTC) is met, followed by evaluation of a query termination condition (QTC) based on real-time response characteristics. This decentralized approach eliminates the need for centralized telemetry aggregation, improves scalability, enhances privacy, and reduces operational costs.

30 Claims, 4 Drawing Sheets

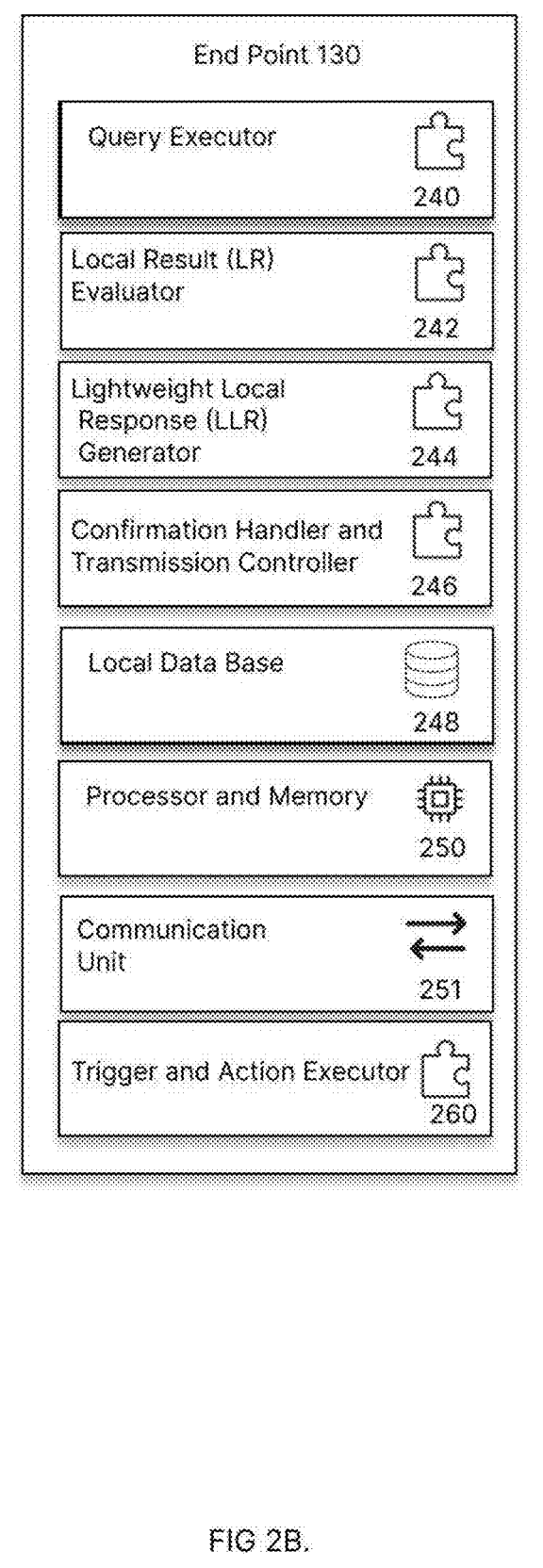

End Point 130

Query Executor
240

Local Result (LR)
Evaluator
242

Lightweight Local
Response (LLR)
Generator
244

Confirmation Handler and
Transmission Controller
246

Local Data Base
248

Processor and Memory
250

Communication
Unit
251

Trigger and Action Executor
260

FIG 2B.

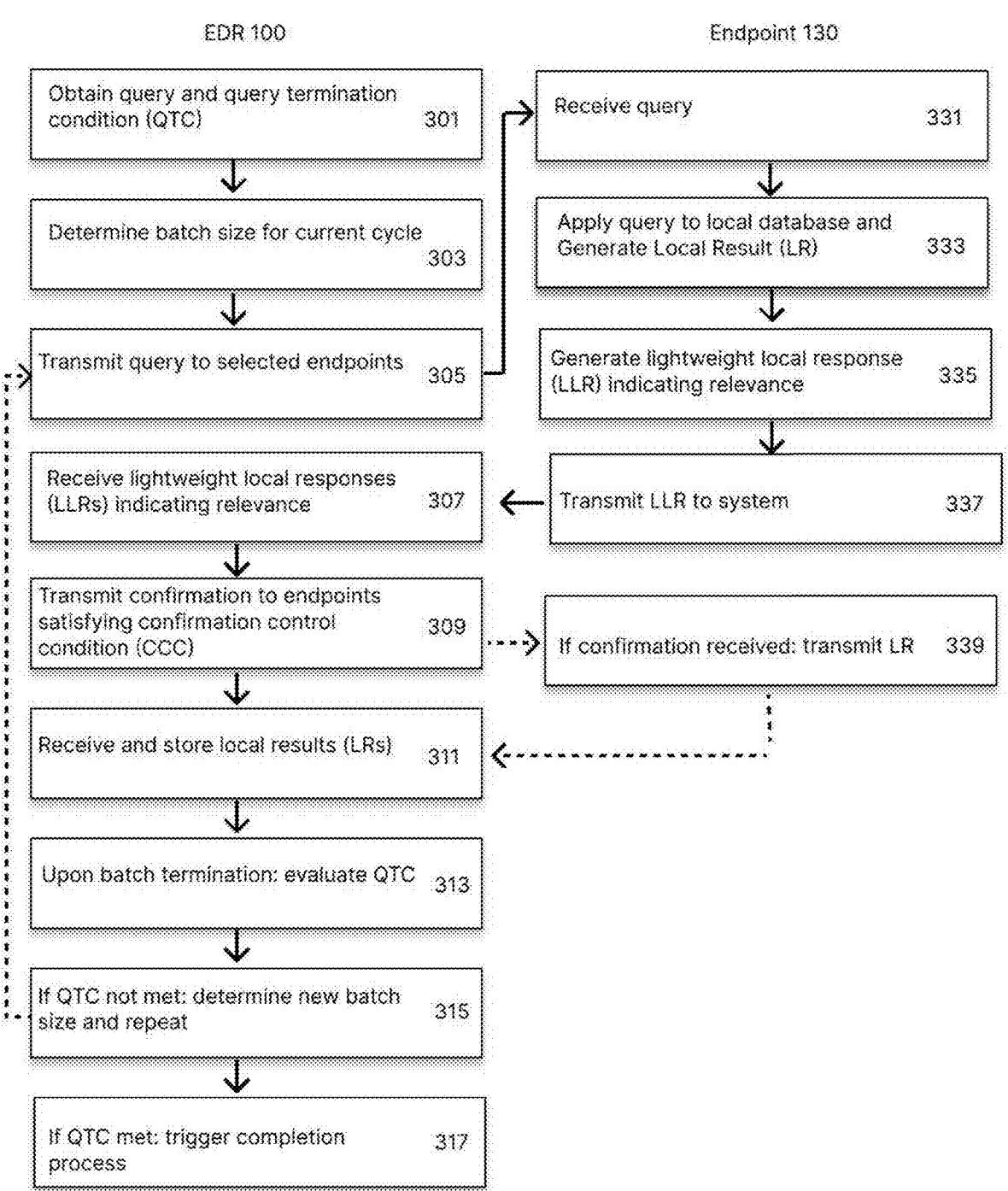

EDR 100

Obtain query and query termination condition (QTC)    301

Determine batch size for current cycle    303

Transmit query to selected endpoints    305

Receive lightweight local responses (LLRs) indicating relevance    307

Transmit confirmation to endpoints satisfying confirmation control condition (CCC)    309

Receive and store local results (LRs)    311

Upon batch termination: evaluate QTC    313

If QTC not met: determine new batch size and repeat    315

If QTC met: trigger completion process    317

Endpoint 130

Receive query    331

Apply query to local database and Generate Local Result (LR)    333

Generate lightweight local response (LLR) indicating relevance    335

Transmit LLR to system    337

If confirmation received: transmit LR    339

FIG 3.

SYSTEM AND METHOD FOR DECENTRALIZED ENDPOINT DETECTION AND RESPONSE

TECHNICAL FIELD

The presently disclosed subject matter relates to cyber security and, more particularly, to Endpoint Detection and Response (EDR) systems.

BACKGROUND

Enterprises employ Endpoint Detection and Response (EDR) systems to complement traditional antivirus and antimalware solutions in their cybersecurity infrastructure. While conventional security tools focus on known threats using, for example, signature-based detection, EDR solutions provide more advanced capabilities: continuous monitoring, threat hunting, and incident response by collecting and analysing endpoint activity data. EDR platforms help security teams identify suspicious behaviours, detect advanced persistent threats (APTs), and respond to security incidents in real time.

GENERAL DESCRIPTION

In today's digital era, the number of connected computing devices (or "endpoints") continues to expand, encompassing devices such as personal computers, smartphones, home IoT devices, industrial control systems, and large-scale cloud infrastructures. As reliance on these technologies deepens, cybersecurity threats have grown correspondingly more sophisticated and pervasive. Ensuring the protection of such a heterogeneous and ever-growing set of devices poses escalating technical and operational challenges.

Conventional Endpoint Detection and Response (EDR) systems typically rely on large, centralized data lakes to aggregate logs and event records from supervised endpoints. While this facilitates initial analysis and enhances enterprise-wide visibility—a critical requirement for many organizations—it imposes significant burdens on storage, processing, and system maintenance, limiting scalability in high-volume deployments. Additionally, such centralized architectures often prove unsuitable for individuals, small businesses, and privacy-sensitive organizations.

A key factor limiting scalability is the sheer volume of telemetry generated by each endpoint, including for example, process execution events, file system and registry activities, network connections, user behaviours, memory usage, driver and module loads, external device access, script executions, security events, persistence mechanisms, indicators of compromise (IOCs), and behavioural anomalies. Even without active threats, a single endpoint can generate hundreds of thousands to millions of these events daily, creating prohibitive demands on infrastructure resources.

Endpoint filtering is widely applied to reduce telemetry volume and enable transmission to a centralized backend. However, filtered data must retain sufficient detail to detect never before seen as well as evolving threats, often requiring additional context and historical records for anomaly detection, threat hunting, and incident response. Consequently, even aggressive filtering typically results in several megabytes of telemetry per endpoint daily.

When multiplied across thousands or millions of endpoints, these storage requirements become immense. Furthermore, since many cyber threats evolve gradually over days, weeks, or even months, EDR systems must retain telemetry over extended periods, further compounding storage demands. As cybersecurity threats continue to evolve and detection methodologies become increasingly sophisticated, EDR systems are forced to continuously expand both the scope and granularity of collected telemetry. This ongoing data inflation places escalating pressure on storage infrastructure, data processing capabilities, and operational budgets.

Considering that supporting telemetry at this scale can require tens to hundreds of petabytes of storage and incur ongoing costs of millions of dollars per month, traditional centralized EDR architectures become unsustainable for broad deployment, necessitating scalable solutions deployable across diverse and extensive endpoint populations.

The lack of practical, cost-effective security solutions for individual users and small businesses has created a long-standing gap in cybersecurity protection. Law enforcement agencies have highlighted this issue; for example, the FBI's Internet Crime Complaint Center (IC3) reports thousands of annual impersonation scams and tech-support fraud incidents that exploit weak endpoint protections. These findings underscore a critical need for an alternative EDR model capable of delivering enterprise-grade functionality in a more accessible, efficient, and scalable manner.

The presently disclosed subject matter reimagines the methodology underlying an EDR system through a relevance-driven, globally scalable architecture. Endpoint devices locally process security event queries on their local databases, generate and return compact indicators—referred to herein as Lightweight Local Responses (LLRs) —that reflect relevance of the local result (LR) to the query. LRs are transmitted selectively, based on confirmation logic. This selective confirmation allows both control as well as reduction in bandwidth, storage, and processing overhead, enabling the system to scale efficiently (e.g. to hundreds of millions of endpoints) without overwhelming network, storage, or computation resources.

In addition, a dynamic batch cycle (referred to here also as "processing cycle") mechanism allows for efficient resource utilization—for example, by not sending all queries to all endpoints at all times but instead offering greater control. For instance, it enables scaling a specific query as needed, sending some queries to all endpoints in a single batch, and directing others only to specific endpoints based on metadata. All of this, and more, will be elaborated upon in the detailed description.

The systems and methods disclosed herein can serve as a standalone solution in decentralized environments (e.g., endpoints that aren't part of any enterprise or are under different enterprises), or as a complementary layer alongside an existing enterprise EDR deployment. Accordingly, the proposed technology is well-suited across a wide spectrum of scenarios—from individual home users to large-scale enterprises, critical infrastructure (e.g., different hospitals across the country), and government agencies.

The subject matter disclosed herein addresses key limitations of traditional centralized architectures. By distributing data storage and query processing to individual endpoints, the system achieves substantial scalability without inherent data volume constraints and significantly reduces associated operational costs. Decentralization enables rapid query response times—even for complex queries—through immediate endpoint-based processing and incremental delivery of results (LLRs and LRs), thus eliminating central processing bottlenecks. Additionally, critical data management tasks such as migration become straightforward, cost-effective, and low risk, contrasting significantly with the complex and costly procedures common in centralized systems. Furthermore, by avoiding centralized aggregation of telemetry data, the decentralized model substantially mitigates security risks, enhancing endpoint anonymity and providing robust protection particularly suitable for privacy-sensitive entities like government agencies.

According to a first aspect of the presently disclosed subject matter, there is provided a computer-implemented method of endpoint detection and response (EDR) across a plurality of endpoints (EPs), each EP storing local security-related event data in a local database, the method comprising:

(a) obtaining a query configured to identify at least one security-related event, and a query termination condition (QTC);

(b) determining a batch size specifying the number of EPs to include in a current batch cycle;

(c) transmitting the query to a batch of EPs selected to match the batch size;

(d) processing data associated with the batch of EPs until a batch termination condition (BTC) is met, including:

(i) receiving, from one or more EPs, a lightweight local response (LLR), the LLR indicating at least that a respective local result (LR), generated by applying the query to the endpoint's local database, is relevant;

(ii) transmitting confirmation to a subset of EPs whose LLRs satisfy a confirmation control condition (CCC) for LR retrieval;

(iii) receiving and storing the LR in a data storage;

(e) in response to the BTC being met:

(i) evaluating the QTC based at least on the stored LRs, wherein the compliance with the QTC is data-dependent as it is evaluated based on information derived in real-time from the local responses as they are received;

(ii) if the QTC is not satisfied:

determining a new batch size for a next batch cycle;

repeating operations (c) through (e) within the next batch cycle;

(iii) otherwise, triggering a completion process dedicated to finalizing the query execution;

thereby facilitating a decentralized EDR across a plurality of EPs.

In addition to the above features, the method according to this aspect of the presently disclosed subject matter can optionally comprise one or more of features (i) to (xxi) below, in any technically possible combination or permutation:

i. Wherein the BTC includes one or more of: (a) receiving LLRs determined to be relevant from a predefined threshold proportion of the EPs in the batch; (b) reaching a predefined number of received LLRs; or (c) expiration of a predefined timeout period.

ii. Wherein, responsive to determining that the batch is abnormal, the method comprises modifying the CCC to suppress confirmations for LR retrieval.

iii. Wherein the classification of the batch as abnormal is based on one or more of: (a) detection of a deviation from a predefined threshold proportion of LLRs relative to the batch size; (b) detection of a deviation from an expected distribution of LLRs among the selected endpoints.

iv. Wherein the method further comprises receiving a manual override of the suppression and, in response, enabling confirmation to one or more endpoints whose LLRs indicate potential relevance, to trigger targeted data retrieval.

v. Wherein determining the new batch size comprises applying a scaling strategy that defines the manner in which the batch size is updated between batch cycles.

vi. Wherein the scaling strategy is selected from: (a) incremental scaling strategy; (b) exponential scaling strategy; or (c) hybrid scaling strategy, wherein the system dynamically transitions between strategies.

vii. Wherein the scaling strategy is selected based on one or more query-specific factors, including the query goal or context.

viii. Wherein, in response to the QTC not being satisfied, the method comprises repeating selection of one or more endpoints to be included in the next batch cycle in accordance with the new batch size. Wherein reselection can be based for example, at least in part on endpoint-specific criteria, historical batch performance, or dynamic system conditions.

ix. Wherein the batch of EPs is selected according to one or more endpoint-metadata attributes.

x. Wherein the batch of EPs is selected by way of random selection, the random selection being performed within, across, or independently of any endpoint-metadata attributes.

xi. Wherein one or more criteria used to evaluate whether a LLR satisfies a CCC are encoded in a compact representation, the compact representation comprising one or more of: a binary indication of relevance, a numeric confidence score, a classification result, a hashed descriptor, or another data structure summarizing relevance signals.

xii. Wherein each received LLR is evaluated in real time, and a determination is made on a per-endpoint basis whether the LLR satisfies a CCC; and wherein received LRs are made available for downstream processing prior to the completion of the current batch cycle.

xiii. Wherein the method further comprises selectively retrieving full local database data from one or more EPs in the batch, in addition or instead of retrieving LRs.

xiv. Wherein the QTC is determined as satisfied if accumulated stored LRs comply with at least one of: (a) a predefined number of distinct response attributes; and (b) coverage across a predefined number of distinct endpoint metadata attributes.

xv. Wherein the QTC is further determined as satisfied if at least one of the following is met in combination with clause (a) or (b) of feature (xiv): (a) a statistical condition computed over the stored local responses, including a convergence in match rate or frequency distribution; or (b) receiving relevant responses from a minimum number of distinct endpoints.

xvi. Wherein the method comprises terminating the query execution in response to expiration of a predefined timeout or a user-initiated interruption; and wherein such termination does not constitute satisfaction of the QTC.

xvii. Wherein the method comprises dynamically modifying the CCC in real-time during execution of a current batch cycle or for a subsequent batch cycle based at least in part on the QTC.

xviii. Wherein dynamically modifying the CCC is based on previously received LRs, to prioritize confirmations expected to contribute to satisfying the QTC, and to suppress confirmations from endpoints associated with endpoint-metadata attribute groups that have already sufficiently contributed to the QTC.

xix. Wherein the dynamic modification of the CCC includes excluding endpoints associated with one or more endpoint-metadata attribute groups that have already satisfied a QTC objective from selection in one or more subsequent batch cycles.

xx. Wherein each LLR is represented in a compact format selected from: a single bit, a hashed descriptor, or any other compact format.

xxi. Wherein the method is compatible with a distributed architecture in which EPs operate asynchronously and independently, with coordination achieved through the batch-control logic and dynamic CCC evaluation.

According to a second aspect of the presently disclosed subject matter, there is provided a computer system for endpoint detection and response (EDR) across a plurality of endpoints (EPs), each storing local security-related event data in a local database, the system comprising at least one processor and memory circuitry (PMC), and being communicatively connected to the plurality of EPs via a network; wherein the system is configured to perform operations in accordance with the method described in the first aspect above. The system may optionally further comprise one or more of the features (i) to (xxi) listed above, mutatis mutandis, in any technically possible combination or permutation.

According to a third aspect of the presently disclosed subject matter, there is provided a non-transitory computer-readable storage medium having stored thereon instructions which, when executed by at least one processor, cause a computer system to perform operations of the method described in the first aspect above. The instructions may optionally implement one or more of the features (i) to (xxi) listed above, mutatis mutandis, in any technically possible combination or permutation.

According to a fourth aspect of the presently disclosed subject matter, there is provided a computer-implemented method of endpoint (EP) interaction with a decentralized endpoint detection and response (EDR) system over a communication network, the endpoint comprising at least one processor, memory circuitry (PMC), and a local database storing security-related event data, the method comprising:

receiving, from the decentralized EDR system, a query configured to identify at least one security-related event; (b) applying the query to the local database to generate a local result (LR); (c) evaluating the LR to determine whether it satisfies a relevance criterion associated with the query; (d) in response to determining that the LR satisfies the relevance criterion, generating a lightweight local response (LLR) indicative of the relevance of the LR to the query; (e) transmitting the LLR to the decentralized EDR system; and (f) responsive to receiving, from the decentralized EDR system, a confirmation indicating that the LR is confirmed, transmitting the LR to the decentralized EDR system.

The presently disclosed subject matter further contemplates an endpoint (EP) device comprising at least one processor, memory circuitry (PMC), and a local database storing security-related event data; wherein the EP device is configured to perform operations in accordance with the method described in the fourth aspect of the presently disclosed subject matter.

The presently disclosed subject matter further contemplates a non-transitory computer-readable storage medium having stored thereon instructions which, when executed by a computer, cause the computer to perform operations in accordance with the method described in the fourth aspect of the presently disclosed subject matter.

The presently disclosed subject matter further contemplates a distributed computer system for decentralized endpoint detection and response (EDR), comprising a central system and multiple endpoints (EPs), each with processing circuitry and a local database of security-related event data. The central system distributes a query to a selected batch of EPs. Each EP applies the query to its local database to generate a local result (LR), evaluates whether the LR satisfies a relevance criterion, and, if so, transmits a Lightweight Local Response (LLR) to the central system. The central system evaluates each LLR against a confirmation control condition (CCC) and confirms only those deemed relevant. Confirmed EPs then transmit their full LRs. After a batch termination condition (BTC) is met, the system evaluates a query termination condition (QTC) based on the data received in real-time. If the QTC is unmet, a new batch is formed and the cycle repeats. This enables scalable, relevance-driven, and selective data collection across distributed endpoints. The system may optionally further comprise one or more of the features (i) to (xxi) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2B illustrates a non-limiting example of an internal components design of an endpoint configured to participate in the EDR system, in accordance with certain examples of the presently disclosed subject matter; and FIG. 3 illustrates a flowchart of exemplary operations, including but not limited to query execution and response aggregation across a decentralized endpoint environment configured to participate in the EDR system, in accordance with certain examples of the presently disclosed subject matter.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, and circuits have not been described in detail so as not to obscure the presently disclosed subject matter.

Figure 1:
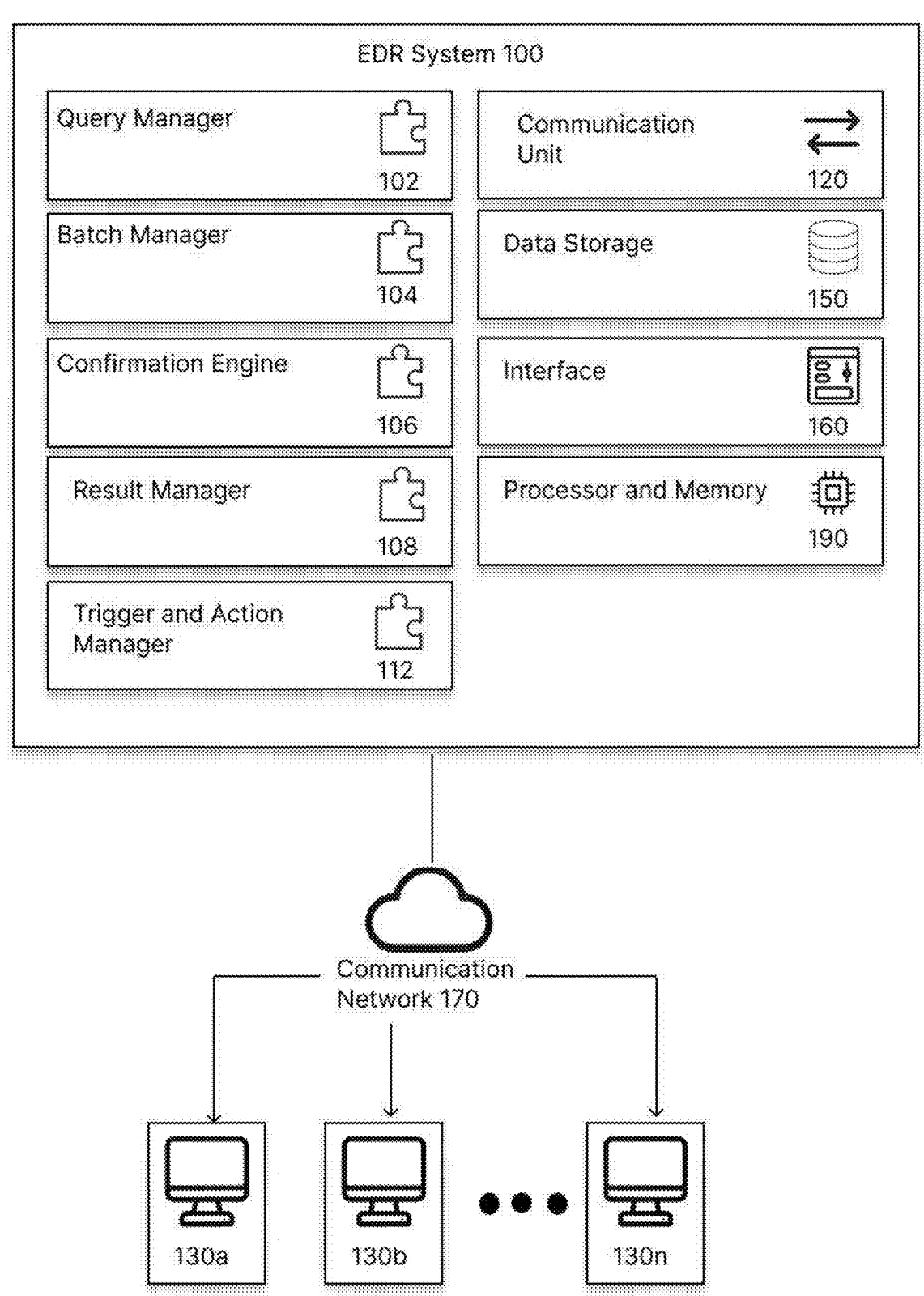
FIG. 1 illustrates a block diagram of an example EDR system 100, in accordance with certain examples of the presently disclosed subject matter.

FIG. 1 illustrates a computer system 100 for decentralized endpoint detection and response (EDR), configured to operate across a plurality of endpoints (EPs) 130*a*-130*n* connected via a communication network 170. Each endpoint 130 (*a-n* indicating any suitable number) represents a computing device—such as a personal computer, workstation, laptop, Smartphone, IoT appliance, or virtual machine. Each endpoint stores security-related event data in a local database, specific examples are set forth herein below.

System 100 comprises a Query Manager 102, a Batch Manager 104, a Confirmation Engine 106, a Result Manager 108, a Trigger and Action Manager 112, a Communication Unit 120, a Data Storage 150, and an Interface 160. System 100 further includes processor and memory circuitry (PMC) 190, which includes one or more computer processors operatively connected to one or more computer memories. The PMC enables the various functionalities of the system's runtime components, including for example query handling, batch processing, result confirmation, and communication management. During operation, PMC 190 retrieves the relevant program code and data from a data storage (e.g., storage 150), loads them into memory, and orchestrates execution across the system. These components collectively facilitate query execution, response confirmation, and coordinated operations across a distributed population of endpoints.

Figure 2A:
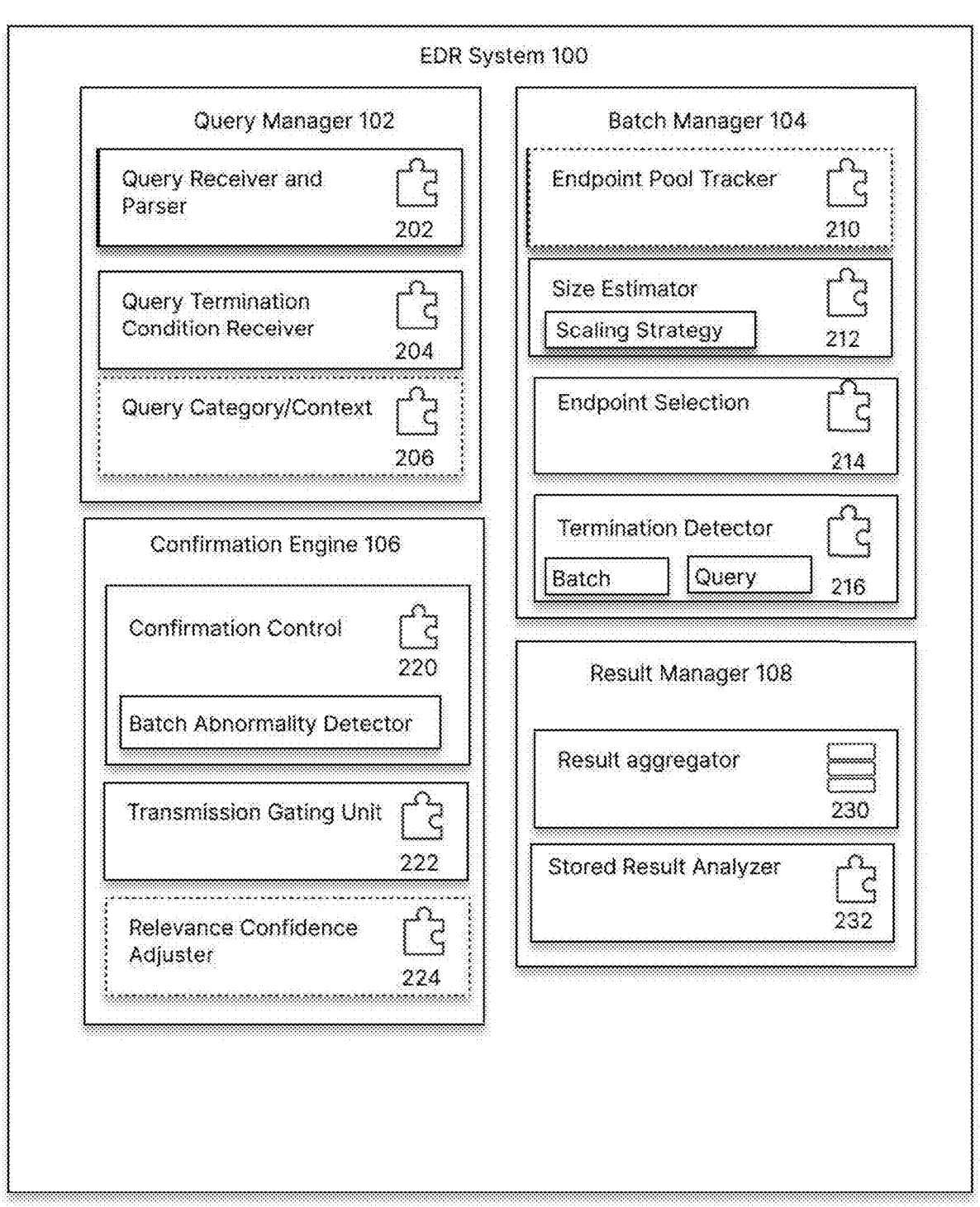
FIG. 2A illustrates a non-limiting example of an internal components design of the EDR system, in accordance with certain examples of the presently disclosed subject matter.

Notably, the division into specific component 100 as shown in FIGS. 1, 2A and 2B is provided by way of example only, and alternative designs are contemplated as well. The components may be implemented on a single computing device or distributed across multiple devices within a cloud platform, server cluster, or other networked environment. In distributed configurations, submodules of system 100 may execute for example across separate machines, communicating over network 170 to collectively perform the method described herein.

The Query Manager 102 is configured to receive, or in some examples generate, a query configured to identify at least one security-related event and a corresponding query termination condition (QTC). As explained below, the QTC is data-dependent, as it is evaluated based on information derived in real-time from the responses as they are received. The Batch Manager 104 is configured to determine a batch size specifying the number of endpoints to include in a processing cycle. The Confirmation Engine 106 is configured to evaluate lightweight local responses (LLRs) received from the endpoints and to issue confirmations based on whether an LLR satisfies a confirmation control condition (CCC). The LLR is configured to indicate at least whether the local result (LR), generated locally by each endpoint applying the query to the local database, is relevant. The Result Manager 108 is configured to handle the receipt and storage of local results (LRs) into the Data Storage 150. Optionally, a Trigger and Action Manager 112 is configured to initiate actions such as alerting, automated containment, or updating detection rules. Such actions are known in the art of cybersecurity EDR systems and are not described in detail for the sake of brevity.

FIG. 2A illustrates, by way of example, an internal component view of the EDR system 100. The Query Manager 102 includes a Query Receiver and Parser 202 configured to accept a query and a corresponding QTC. The query may be parsed and normalized into an internal representation suitable for downstream batch processing and evaluation. The QTC defines the condition under which query execution is considered complete and may incorporate dynamic and result-dependent evaluation logic, as further described in connection with the method flow (FIG. 3). The Query Receiver and Parser 202 operates in conjunction with other system components to initiate query lifecycle management, and may additionally support logging or tracking mechanisms, as applicable. Query parsing, normalization, and dispatch mechanisms of this type are known in the art and are therefore not described in further detail herein.

The Batch Manager 104 is responsible for orchestrating processing cycles. This includes determining how many endpoints to engage in each batch (i.e. batch size) and what group of EPs to select corresponding to the determined batch size. As shown in FIG. 2A, the Batch Manager 104 includes, in some examples, an optional Endpoint Pool Tracker 210, a Size Estimator 212, a Selection Scheduler 214, and a Termination Detector 216. The Endpoint Pool Tracker 210, if present, may maintain a record of endpoint metadata such as geographic region, operating system type, or historical responsiveness. The endpoint metadata examples provided herein below are illustrative and not intended to be exhaustive. The Size Estimator 212 determines a batch size i.e. any natural number between 1 and the total number of addressable EPs for each cycle (e.g. 1000, 10,000, 100,000 etc.), and may, in some examples, support configurable scaling strategies, which define the manner in with batch size is updated between cycles and may include for example, incremental, exponential, or hybrid schemes; selection and adaptation of such strategies are elaborated in connection with the method flow (FIG. 3 below). The Selection Scheduler 214 identifies a group of endpoints corresponding to the determined batch size, and in some examples may apply randomization or policy-driven selection based on endpoint metadata attributes, as further detailed within the method flow (FIG. 3). The Termination Detector 216 functions, in some examples, as a batch status tracker for both the batch and/or a query termination status tracker. It may monitor the status of each batch and/or a query—including receipt of lightweight local responses (LLRs), confirmation issuance, and timeout conditions—and may coordinate with other modules to evaluate whether a batch termination condition (BTC) or a QTC has been met. Batch and query termination detection are logically distinct but may operate in parallel e.g., under the oversight of this module.

The Confirmation Engine 106 include a Confirmation Control Module that is configured to determine, for each received lightweight local response (LLR), whether the LLR satisfies a confirmation control condition (CCC), and, if so, to issue a confirmation to the corresponding EP for retrieval of the local result (LR). As shown in FIG. 2A, the Confirmation Control Module 220 may include a Batch Abnormality Detector configured to classify a batch as abnormal based on, for example, detection of a deviation from an expected distribution of LLRs among the selected endpoints and/or a detection of a deviation from a predefined threshold proportion of lightweight local responses relative to batch size.

The confirmation engine in some examples further includes a Transmission Gating Unit 222, and a Relevance Confidence Adjuster 224. The Transmission Gating Unit 222 issues confirmations to endpoints whose LLRs satisfy the CCC. In some examples, the Relevance Confidence Adjuster 224 may dynamically modify the CCC during an active batch cycle based on emerging response context. Although not shown in FIG. 2A, the Confirmation Engine 106 may also include an Override Receiver configured to accept manual or policy-based override instructions (e.g. via interface 160) enabling confirmation to one or more endpoints despite prior suppression. These subcomponents operate in coordination to support real-time, relevance-based transmission control during query execution.

The Result Manager 108 is responsible for handling local results (LRs) confirmed for transmission by the system. As shown in FIG. 2A, the Result Manager 108 includes a Result Aggregator 230 and a Result Storage Interface 232. The Result Aggregator 230 is configured to receive LRs from one or more EPs in response to confirmation signals transmitted to them and may, in some examples, perform management operations such as, normalization, metadata tagging, or non-transformative formatting prior to persistence. The Stored Result Analyzer 232 (which, in some cases, may also be referred to as "Result Storage Interface") facilitates the storage of received LRs in the Data Storage 150 and may support operations such as, indexing, deduplication, and access control functions. In some examples, stored LRs may be made available for downstream centralized operations such as investigation, correlation, or analytics. These storage and access operations are known in the art and may be implemented using conventional database or document store technologies.

The Communication Unit 120 is configured to manage bidirectional message delivery between the system 100 and the plurality of endpoints 130*a*-130*n* via the communication network 170. In some examples, the Communication Unit 120 may support secure, authenticated channels for transmitting queries, receiving LLRs, issuing confirmations, and receiving LRs. Communication may occur over public or private networks, including virtual private networks (VPNs), cloud-based message brokers, or standardized communication protocols.

The Interface 160 enables interaction with the system by various entities including for example, human analysts, automation tools, orchestration systems, or generative AI agents to interact with the system 100. In some examples, the interface includes graphical and/or programmatic components for issuing queries, specifying a QTC, or initiating override instructions or centralized operations performed on received data, or related to the trigger and action manager 112. These interaction mechanisms are known in the art and may be implemented using conventional user interface technologies or application programming interfaces (APIs).

FIG. 2B illustrates, by way of example, an internal component view of an endpoint 130 configured to participate in decentralized endpoint detection and response. Each endpoint includes a local database 248 storing security-related event data, and processor and memory circuitry (PMC) 250, which includes one or more computer processors operatively connected to one or more computer memories. The PMC is configured to execute the various functionalities of the endpoint's runtime components including operation related to query processing and response generation.

According to some examples, the endpoint architecture includes a Query Executor 240 configured to apply an externally received query to the local database 248 to generate a local result (LR). A Local Result Evaluator 242 is configured to assess the LR to determine whether it is relevant to the query. An LLR Generator 244 is configured, in some examples, to produce a lightweight local response (LLR) indicating whether the LR satisfies a relevance criterion. The LLR is transmitted to the central system for evaluation. A Confirmation Handler 246 is configured to receive confirmation instructions from the system and, in response, transmit the corresponding LR. In some examples, the endpoint further includes a Trigger and Action Executor 260, which may coordinate with the Trigger and Action Manager 112 to execute operations such as, remediation, logging, or orchestration logic based on confirmed detections. Operations performed by these components are described in detail in connection with the method flow.

Turning to FIG. 3 it shows an example of operations carried out by system 100. For ease of understanding and continuity of description, some operations are described with reference to components shown in the previous figures; however, this is done by way of non-limiting example only, and other system designs and implementations are contemplated as well. FIG. 3 shows operations executed by the system (EDR side) and operations executed by the endpoints (EP side), and their respective interactions. Notably, although the figure refers to a single endpoint for illustration purposes, it is intended to demonstrate the behaviour and interactions of the system with a plurality of endpoints operating concurrently. For illustrative purposes alone and by way of example only, operations in FIG. 3 may be described with reference to components shown in FIGS. 1, 2A, and 2B. Although the figure refers to a single endpoint, it is intended to demonstrate the behavior and interactions of the system with a plurality of endpoints operating concurrently.

The system obtains (e.g., receives or generates) a query configured to identify at least one security-related event, along with a QTC (301). In some examples, the query and/or QTC are supplied via the Interface 160. The query is received by the Query Manager 102, e.g., via the Query Receiver and Parser 202, which normalizes the query into an internal representation suitable for distributed processing.

The decentralized EDR system disclosed herein supports flexible and targeted querying over distributed telemetry data. In the decentralized EDR system, queries that would traditionally be executed centrally in classical EDR setups can instead be distributed to endpoints for local processing. As used herein, a query configured to identify at least one security-related event may target indicators such as a known malware hash, a suspicious command-line invocation, or a file drop pattern associated with a known adversary technique. In some examples, the query may also include constraints based on endpoint metadata—such as operating system type, installed software, geographic region, or user role—which may influence both which endpoints are selected for participation, and/or how those endpoints evaluate relevance against the query.

In some examples, the query may additionally be categorized by context (e.g. via Query Context/Category 206), including for example, whether it is part of a rare-pattern hunt, a routine policy scan, or a general posture evaluation. The query may carry classification tags to help downstream components understand its purpose—for example, whether it is intended to generate few highly targeted results or broad insights across the fleet. In some examples, this classification may later influence how the system interprets LLRs and/or LRs distributions, such as what constitutes an abnormal batch, and/or how it applies suppression and confirmation thresholds. These effects are described in detail below.

The QTC specifies when the system should stop processing a query. It is referred to as "data-dependent," meaning the stopping decision depends on the retrieved results. The system may continue processing or may stop, depending on data observed during retrieval. Data characteristics such as relevance, diversity, and coverage of the responses govern this decision. Because this decision is based on these characteristics of the retrieve data which are derived in real-time, rather than on a fixed number of responses, it is not possible to determine in advance how many LLRs and/or LRs will be required to satisfy the QTC.

The QTC is based on one or more dynamic and result-dependent signals detected across previously received LRs, where different signals can be applied. In some examples, one such signal is response attribute diversity. For example, whether the system has observed a sufficient variety of distinct response characteristics (e.g., at least x unique values, where x is a predefined threshold value specified in the query parameters or QTC), characteristics such as file hashes, behavioural patterns, or threat indicators. What qualifies as "sufficient" may depend on the query (as specified within the query, in the QTC, or by the query Category/Context module 206). For example, a query designed for broad visibility or anomaly hunting may require higher diversity to be satisfied, whereas a query targeting a known, well-scoped indicator may conclude earlier if the pattern is consistently matched. If the observed diversity remains narrow relative to the query's intent, the system may infer that additional responses are needed to uncover hidden variations or edge cases.

Another signal might be coverage, meaning whether results have been returned from a broad and meaningful set of endpoints. For example, the QTC may require geographic distribution, representation across different operating systems, or time-based spread. A lack of coverage may indicate blind spots that would justify continued data collection.

A third category might be statistical completion. Here, the system evaluates whether additional responses are likely to provide new insights. This may include detecting that new batches return similar results (stable match rate) or that new threat signals are appearing less often (declining discovery rate). These signs tell the system that it's no longer learning substantially new information from continued processing.

In some examples, the system may also require that relevant LRs are received from a minimum number of distinct endpoints. This condition—called endpoint spread—is deterministic but cannot satisfy the QTC on its own. This is because even if many endpoints respond, they may all report the same event or match, providing no meaningful variation. Therefore, it might be used in combination with at least one data-dependent condition (from the categories explained above) to verify that the results are not only widespread, but also meaningfully distinct.

While timeout expiration or manual cancellation may halt execution, such events generally do not count as satisfaction of the QTC. The QTC is only considered fulfilled when the system determines—based on the actual LRs—that further collection is unlikely to improve results.

In some examples, the QTC may be satisfied based on evaluation of a single attribute or signal from a single category, as long as it is at least data-dependent. In other cases, the system may evaluate combinations of multiple attributes—that can be for example, within the same category (e.g., multiple indicators of statistical convergence, such as variance reduction and mean stabilization), or across categories (e.g., combining measures of diversity, endpoint spread, and coverage to assess output robustness). The system may apply logical operators, weightings, or thresholds to determine whether the cumulative evidence across these signals is sufficient to consider the query complete. This flexible evaluation framework allows the QTC to be tuned based on the nature of the query, operational constraints, or risk thresholds.

The decision to consider the QTC as satisfied may be made using a combination of system logic and configurable policy. In some examples, an analyst or administrator may define explicit termination rules based on domain knowledge or mission priorities. In other examples, the system may apply computer logic, such as a machine learning model trained on historical query-response patterns to infer, predict, or adaptively refine QTC fulfilment decisions. Such models may incorporate factors such as endpoint diversity, historical false-positive rates, expected match distributions, and operational load, allowing the system to generalize from prior executions and adjust termination behaviour in real time. It should be noted that QTC assessment is distinct from abnormal batch detection, described below. While both mechanisms may monitor the same response characteristics, they serve different goals: e.g. QTC coverage focuses on ensuring sufficient diversity and representativeness of the data, whereas abnormal batch detection is concerned with identifying anomalies that suggest manipulation, misconfiguration, or unexpected behaviour patterns.

The system determines a batch size specifying how many endpoints are to be included in the current processing cycle (e.g. 1000, 10,000, 100,000, 1,000,000, etc.; 303). In some examples, this operation is performed by the Size Estimator 212, a subcomponent of the Batch Manager 104.

The Size Estimator 212 may apply a configurable scaling strategy, which may include for example, incremental scaling, exponential scaling, or a hybrid strategy that dynamically transitions between the two. Under an incremental strategy, the system may increase or decrease the batch size by a fixed amount with each cycle (e.g., by 10,000 endpoints per cycle). Under an exponential strategy, the batch size may double or grow multiplicatively across cycles to accelerate signal discovery. In a hybrid approach, the system may, for example, begin with exponential growth to rapidly assess signal presence, then shift to incremental changes as response volume rises—or vice versa. The resulting batch size is not just a function of scaling strategy but also reflects an actual quantity of endpoints. For example, the batch size may be set to 20,000 endpoints in one cycle, and 100,000 in the next. In some cases, the Size Estimator 212 may decide to keep the same batch size for several and/or all batch cycles for a given query.

As a non-limiting example, a query associated with rare-pattern hunting may initially use small batch sizes (e.g. 10,000 or more) and escalate aggressively when few or no relevant LLRs are returned (as expected for such rare query). Conversely, a query targeting a well-known indicator may begin with a larger initial batch, anticipating common matches. Factors that may influence the initial batch size and the selection of a scaling strategy (implemented for example by Size Estimator 212) include the Query Context/Category 206—for example, its classification (e.g., an exploratory query scanning broadly across diverse EPs versus a targeted query focused on specific known indicators); historical match patterns (e.g., prior similar queries yielding many matches, suggesting a smaller, cautious batch, or few matches, suggesting larger coverage); and the intended scope of coverage (e.g., applying the query to all EPs under EDR supervision or limiting it to endpoints located in one or more specific countries or departments).

In some examples, the query may also define an upper limit on total query participation (e.g. from the Query Context/Category 206). As a non-limiting example, even if the system is connected to 20 million endpoints, an analyst may specify that up to 1 million endpoints are to be considered for the current query. This constraint may influence the size and/or scaling behaviour of the batch manager—such as how aggressively to expand batch size.

In other cases, the query may be applied to the entire connected EDRs—for example, 100,000, 10 million, or 100 million, endpoints. This is made feasible by the system's ability to process massive amount of LLRs, which are compact signals designed for minimal overhead (described in detail in subsequent paragraphs). The dynamic batching enables the system to scale query execution adaptively engaging large populations while maintaining efficiency and avoiding unnecessary burden on system infrastructure or endpoint devices (e.g. not sending every query to all the EPs). In some examples, this also enables context-aware execution, depending on the query's context e.g. classification, scope, or intent. i.e. Whether or not initial full engagement is appropriate (vs. dynamic batch scaling) based on the query's goal and objective. As a non-limiting example, a fleet-wide readiness or posture check may intentionally target all connected endpoints to verify that they are active, responsive, and behaving as expected. Additional implementation details related to LLR generation and handling are provided in later sections.

After determining the batch size, the system may select a corresponding subset ("batch") of one or more EPs to participate in the current processing cycle (this subset may also be referred to herein as a selected group of EPs). This operation can be performed for example by the Selection Scheduler 214, a subcomponent of the Batch Manager 104. In some examples, endpoint selection is informed by one or more endpoint metadata attributes which may be tracked and maintained by the Endpoint Pool Tracker 210. The selected group may reflect a wide variety of query goals, such as prioritizing high-risk regions, balancing geographic load, excluding a specific hardware and/or software configuration or vice versa, meaning selecting only those configurations.

Endpoint selection strategies may include for example deterministic, randomized, or hybrid techniques. As a non-limiting example, the system may divide the batch size into uniform subgroups—such as equally sized regional segments—and then apply endpoint metadata selection and/or random selection independently within each group. In other examples, the system may first filter the eligible endpoint population using one or more endpoint metadata attributes, and then randomly select endpoints from the resulting subset. In some cases, the system may apply only random selection across the entire eligible population. These approaches may also be combined, depending on the query and what it tries to achieve. The strategy used may be predefined by policy or determined dynamically at runtime. This allows flexibility in selection logic—for example, to support fair geographic distribution, load balancing, or targeted coverage—while adapting to the classification and objective of each query.

The system transmits the query to a selected group of endpoints, corresponding to the batch size and selection logic determined in the previous operations (305). In some examples, this transmission is handled by the Communication Unit 120, which coordinates message delivery between the system and each selected endpoint. The transmitted payload may include the query itself, and optionally along with any associated policy flags relevant to endpoint-side processing such as batch termination criteria (e.g. query processing time-out).

In various examples, this transmission may occur using a push-based or pull-based model. In a push-based model, the system actively dispatches the query to selected endpoints. In a pull-based model, endpoints poll the system periodically or in response to a trigger, and the system selectively responds by providing the query only to those endpoints deemed eligible within the current batch. In either case, the endpoint receives the query payload in a form compatible with local execution, as described in later operations. In some examples, transmission may occur over authenticated, encrypted channels, and may be staged through a queueing or message broker layer (not shown) to ensure reliability and load balancing.

Turning to EP-side operations in FIG. 3, each selected endpoint applies the received query to its local database of security-related event data (331). This processing occurs entirely on the endpoint side and does not involve transmitting raw event data to the central system unless and until confirmed. As used herein, "local" refers to the scope of data rather than the physical location of processing—i.e., data associated with an endpoint local database, whether processed on-device or in an isolated cloud context.

Within the endpoint, the local Query Executor 240 applies the query logic to records in its Local Database 248, producing a local result (LR) (333). In some cases, the LR includes multiple matched artifacts—such as several suspicious files, processes, or registry entries—rather than a single isolated hit. In some examples, a Local Result Evaluator 242 determines whether the LR is potentially relevant to the query. This determination may be based on direct matching to known indicators, such as specific file hashes or malware signatures (e.g. In some cases, the LR is relevant if its not empty/null); on rule-based policies, such as process ancestry, script execution patterns, or registry activity; or on machine learning models (ML) trained to estimate anomaly and/or threat likelihood, In some examples, the ML model may be a lightweight or compact model specifically designed to run on local hardware, such as a workstation, server, or mobile device, without requiring external resources. Relevance may be expressed as a binary match, a confidence score, or a classification result, depending on the implementation.

To further clarify, as used herein, the term "relevant" LR refers to the degree to which a locally observed event, artifact, or behaviour is determined to be potentially significant in the context of a threat model, policy framework, or other detection criteria (reflected by the query). This determination may be based for example, on whether the observation (LR) exhibits properties that are similar to, match, or are otherwise correlated with known indicators of compromise (IOCs), behavioural patterns, or policy violations, which may be for example, predefined, centrally maintained by the system 100, dynamically learned, or adaptively updated over time.

In a simple case, a "relevant" LR is one that contains a non-empty result returned by the EP. More generally, a "relevant" LR is defined as one that satisfies one or more predefined indicators—e.g., conditions that reflect potentially malicious or policy-violating activity. These indicators may be based on known threat signatures, behavioural patterns, or system-level artifacts. Non-limiting examples of predefined indicators include: a file hash matching a known malware signature; a process tree resembling a known attack chain; network behaviour consistent with command-and-control (C2) activity patterns; or registry modifications and scripts aligned with known attack vectors. Furthermore, a determination of relevance may apply to individual artifacts, such as a single file or process, or to aggregated or compound observations, including a group of files, a directory, or an entire local database, depending on the structure of the local system and the nature of the suspected security related event (or in another name threat) represented by the query and/or query context.

As used herein, the term "irrelevant" refers to any LR, that does not meet the threshold or criteria for relevance as determined by the system's detection logic, policy framework, or threat model (e.g. local result evaluator 242). While "irrelevant" LRs (e.g., not matching current threat indicators, or anomaly thresholds (depending on the query) are generally not transmitted, their transmission can remain optional and may occur under specific conditions. For instance, irrelevant LRs may be forwarded under specific conditions such as audit mode, debugging, or policy overrides. In some cases, the LLR may include a single-bit or null-value indicator (e.g., 0, false, or an empty sketch) to signify that it is irrelevant. While not conveying threat data, such indicators may implicitly confirm that the endpoint is active and executing monitoring logic. In decentralized systems, this allows the system to infer endpoint health and responsiveness without requiring substantial bandwidth or disclosing sensitive data.

In some examples, the determination of relevance/irrelevance is embedded directly in the query logic—for instance, via exclusion clauses or filters that explicitly define what types of matches should be ignored. In other cases, the relevance scope may be derived from query context, as represented or interpreted by the Query Context/Category 206. For example, a query classified as a routine "policy modifier" scan may be associated with a contextual rule to exclude known administrative tools. This flexible handling of relevance boundaries allows the system to adapt the query structure as needed in order to fulfil its operational intent, even under varying technical or contextual conditions.

Based on the outcome of this evaluation, a lightweight local response LLR is generated (335; e.g., by the LLR Generator 244 constructs). The LLR indicates whether the local result is potentially relevant and may take the form of a single-bit flag, a hashed descriptor, or any other compact encoding format. As explained above, in the implementation where irrelevant LRs do not trigger LLR transmission, the mere presence of an LLR implies potential relevance.

In some examples, the LLR may also include additional summary-level query related metadata, such as the number of matched files, the estimated size of the full result, or a short set of feature indicators.

The purpose of the LLR is to enable scalable evaluation across multiple endpoints without overwhelming system resources. Because the LLR is compact and cost-efficient to generate and transmit, it integrates seamlessly with the system's dynamic batching architecture. The system can flexibly expand or contract batch sizes, without overwhelming network or processing capacity. This design can also be used for preserving privacy, e.g., where LRs are only transmitted upon confirmation, and even then, only in response to specific queries—preventing unnecessary data exposure and eliminating a single point of failure. The LLR mechanism also avoids unnecessary processing overhead by allowing the system to confirm before escalation: Only LRs associated with LLRs that are confirmed as relevant by the receiving system are handled further. In addition, one can maintain control of how many LLRs to confirm (more details will be provided in later sections).

Once generated, the LLR is transmitted to the system for evaluation in the subsequent confirmation operation (337). At this stage, the system has not yet received any full local results—only lightweight indicators that assist in determining which endpoints, if any, should be asked to transmit their LR.

In a non-limiting example, when querying a group of endpoints (e.g., 10,000 devices), the LLR may include a hashed descriptor with optional endpoint metadata and/or query meta data (e.g. such as number of matched artifacts, match on multiple feature types both file and/or behaviour, the estimated size of the LR, etc.) to provide a rich representation of the matched pattern.

The system evaluates lightweight local responses (LLRs) received from one or more endpoints to determine whether a full local result (LR) should be retrieved (307). This system side operation can be performed for example, by the Confirmation Engine 106, based on control logic. Each LLR is evaluated for example against a confirmation control condition (CCC), which determines whether the corresponding endpoint should receive a confirmation request to transmit its local result (LR). In some examples, the CCC may be based on one or more criteria, applied individually or in combination, and without requiring all such criteria to be satisfied. These may include the content or structure of the LLR itself—for example, whether it signals a relevant match (e.g. simple binary relevance i.e. LLR bit representation '1', 'yes/no', 'true/false' etc.).

In some examples, the LLR includes or is associated with a confidence score indicating the estimated likelihood that the corresponding local result (LR) is relevant to the query. This score may be computed locally or centrally, using rule-based logic or machine learning models, as known in the art (implemented for example by Confirmation Engine 106). The confirmation control condition (CCC) may include a predefined threshold, such that only LLRs with a confidence score exceeding that threshold are eligible for confirmation. In some examples, the CCC logic includes a confidence bracket defining a minimum and/or maximum allowable confidence range for triggering confirmation. This bracket may be determined for example, based on the query's classification or intent—for instance, whether the query is exploratory, targeted, or enforcement-oriented. An exploratory query CCC may tolerate lower confidence values to capture rare signals, whereas an enforcement-driven query CCC may require higher confidence thresholds to minimize false positives. In some examples, the CCC further includes a threshold condition requiring that the LLR indicate that its associated LR has a minimum number of matched artifacts before a confirmation is issued, helping the system avoid retrieving local results that are likely to be sparse or inconsequential.

In some examples, the system also evaluates whether the LLR indicate that its associated LR reflects a match across multiple feature types—for example, both file-based and behaviour-based indicators. The CCC may be configured to confirm only those LLRs that reflect such multi-dimensional relevance, thereby improving signal quality and filtering noise.

In some implementations, the LLR may include metadata representing an estimated size of the corresponding LR, such as in bytes or object count. The CCC may require that this size be at least a predefined minimum (e.g., to ensure sufficient context) and/or not exceed a maximum threshold (e.g., to control bandwidth or processing overhead), depending on the query objectives or operational policy. Additionally, the CCC may incorporate one or more endpoint-metadata attributes indicating elevated risk or contextual significance, such as a system-assigned risk classification, geographic location, or operating system profile. For example, an endpoint flagged as high risk based on historical detection patterns may be prioritized for confirmation, even if its confidence score is below the default threshold. In some examples, one or more of the above criteria may be reflected in a compact form—such as a single relevance score (e.g. between 0-100), a classifier output (e.g. low, high, etc.), or an encoded summary representation (e.g., a hashed descriptor) —that captures one or more of the underlying evaluation signals in a space-efficient manner suitable for use in decentralized or bandwidth-constrained environments. The confirmation control 220 may apply any of these conditions alone or in combination to determine whether confirmation is warranted.

In some examples, the system may further include a differential evaluation stage (or in another name comparison stage that may be performed by relevance confidence adjuster 224) which incoming LLRs that carry structured content—such as hashed descriptors, or summary metadata—but not to minimal representations such as single-bit flags, are evaluated against local results (LRs) that have been previously stored (e.g. in the result aggregator 230), when an incoming LLR indicates additional relevant data, the system may confirm only the unique components of the corresponding LR that were not previously confirmed. This uniqueness-based confirmation mechanism ensures that only newly observed artifacts—such as files, processes, or metadata elements not included in earlier LRs confirmations—are retrieved or transmitted. For example, if a LR contains some certain known file signatures and includes additional, distinct signatures, only the new, unique items are included in the confirmation payload. This selective confirmation reduces redundancy, preserves bandwidth, and supports scalable, incremental intelligence gathering across large endpoint populations.

In decentralized scalable environments, where processing is performed locally at the endpoint, the differential evaluation stage approach e.g., isolating and confirming only novel or previously unconfirmed LR components, may prevent unnecessary duplicate handling at the central system, further improving scalability and reducing backend processing demands.

In some cases, the CCC reflects the batch cycle's statistical context—meaning how the current set of LLRs compares to expected or typical patterns for the given query. For example, if an unusually high proportion of endpoints return LLRs indicating relevance, the system may detect a spike in match rate that suggests the query is too broad or permissive.

When such conditions (e.g. batch cycle's statistical context) are detected, the system may classify the batch as abnormal. This classification is performed, in some examples, by the Batch Abnormality Detector part of Confirmation Control 220 and may result in suppression of further confirmations within the current cycle. The goal of abnormal batch detection is to control confirmation and data collection when the signal quality appears statistically unreliable or contextually misaligned. For example, preventive excessive retrieval of LRs under such conditions.

In some examples, the criteria used to classify a batch as abnormal may be influenced by the Query Context/Category 206. For instance, a query designated as exploratory may tolerate a higher variance in match distribution, while a query marked as precision-sensitive (e.g., for alerting or enforcement) may require stricter statistical thresholds. Because each query may entail different intent and context, the criteria for what constitutes an abnormal batch can likewise be query-specific, allowing the system to optimize evaluation strategies accordingly.

In some examples, the system includes an override mechanism that allows one or more confirmations to be issued for EPs indicating relevant LLRs, even if those confirmations were previously suppressed due to abnormal batch classification. This functionality may be supported by an Override Receiver (not shown), which in some examples may be implemented as part of Interface 160. The Override Receiver may accept input from an analyst, an automated decision policy, or an upstream orchestration system.

The override capability is valuable for example, in threat hunting and investigative workflows cases, where it may be difficult to distinguish true signals from false positives based solely on statistical patterns (e.g. sometimes even query-specific abnormal batch logic can be insufficient, because attackers may succeed in evading purely statistical defences). As a non-limiting example, unknown (never seen before) or mutated threats often behave in ways that closely mimic benign system behaviour—making them difficult to detect using conventional thresholds (e.g. it will seem as if the batch is abnormal because of false positives noise). A query that appears overly permissive at first, may actually surface as indicative of an emergent or subtle threat. In some cases, even a small variation in query syntax or logic may result in a large shift in match volume, leading the system to flag the batch as abnormal despite the presence of legitimate signals.

In some examples, the Relevance Confidence Adjuster 224 dynamically modifies the confirmation control condition (CCC) during an active batch cycle and/or for following batch cycles. This adjustment logic is informed, in some examples, by the QTC, which may include goals related to endpoint coverage, diversity, or metadata distribution.

This dynamic modification of the CCC can be used to prioritize confirmations that are expected to contribute to satisfying the QTC, and to suppress confirmations from endpoints associated with endpoint-metadata attribute groups that have already sufficiently contributed to the QTC. For instance, the QTC may specify that the query is not considered complete until relevant responses have been received from at least 100 distinct EPs with at least 100 distinct files hashes (malwares). If, during an early batch cycle, relevant responses have already been confirmed from 50 out of the requested 100 files permutations of the malware, the Confidence Adjuster may revise the CCC in real time to suppress further confirmations from EPs containing indication of malware permutation from the previously seen 50 in local results DB. This prevents over-confirmation from overrepresented malware permutations while the system continues to seek fulfilment from the remaining EPs indicating other distinct files hashes.

If the LLR satisfies the confirmation control condition (CCC) or is otherwise manually approved via override (in cases of abnormal batch classification), the system issues a confirmation to the corresponding endpoint (309). This message instructs the endpoint to transmit its corresponding LR which represents the detailed data underlying the previously submitted LLR. Confirmations may be issued individually, in groups, or staged through a communication broker (not shown) depending on network and/or policy constraints.

In response to receiving a confirmation, the endpoint transmits its LR back to the system (339; e.g., by confirmation handler and transmission control 246). The transmission may include the raw matched artifacts, some derivative thereof, or any other data deemed relevant to the query logic.

Upon receipt of the LR (311), the system ingests the LR into its data storage layer via the Result Manager 108, which includes components such as the Result Aggregator 230 and the Stored Result Analyzer 232 (see FIG. 2A). These modules may normalize, tag, and persist the LR for downstream use, including investigation, correlation, visualization, or automated response. In some examples, additional query metadata is attached to the LR—such as batch ID, confirmation timestamp, endpoint identifier, and query context—to support traceability, auditing, and analytics.

In some examples, the system is configured to evaluate each received LLR in real time, making confirmation decisions on a per-endpoint basis without waiting for the full batch cycle to complete. As a result, local results (LRs)

returned by confirmed endpoints may be received and made available for downstream processing—such as correlation, scoring, or visualization executed either by system 100 or by another system connected to system 100—while the current batch cycle is still in progress. For example, an initial subset of confirmed LRs may be streamed directly to a threat investigation dashboard (e.g. via interface 160) or used to trigger enrichment routines (e.g. via trigger and action manager 112), allowing analysts or automation systems to begin reviewing data immediately, even as additional LLRs continue to arrive and be evaluated. This supports detection and investigation workflows without disrupting the dynamic batch control process.

The system evaluates (e.g., as a continuous process) whether the batch termination condition (BTC) has been satisfied (313). The BTC defines when a batch cycle is considered complete, enabling the system to determine whether to continue processing, begin a new cycle, or proceed to query-level evaluation. In some examples, the BTC may be satisfied when the system has already received a predefined number or proportion of relevant lightweight local responses (LLRs) from the currently selected endpoints. Here, "proportion" refers to a percentage of the batch—for example, 0.5% of queried endpoints indicating relevance—or, in some cases, a full cycle response (i.e., ~100% across the batch replied with an LLR either relevant or not). Basing the BTC on response proportion allows the system to terminate the batch once sufficient participation is observed, even if irrelevant LLRs are not returned. Alternatively, the BTC may be based on volume: if the system has received a certain total number of LLRs—relevant or not—it may conclude that the batch has yielded enough data to warrant transition. This volume threshold may be derived from the Query Manager 102 or informed by policy settings configured via Interface 160. A third type of BTC involves timing: if a certain timeout period has elapsed since the batch was initiated, the system may treat the batch as complete and move forward, even if not all endpoints have responded.

In some examples, the specific BTC logic applied may be defined by the query's classification or context—such as those managed by the Query Context/Category 206—or by stored parameters associated with system policy, user preferences, or analyst-defined templates via Interface 160. These rules allow the BTC to align with the intent and operational expectations of the query, whether it is designed for speed, coverage, or precision.

Notably, BTC evaluation operates independently from abnormal batch classification. Even if a batch has not yet met its termination condition, it may still be flagged as statistically abnormal based on signal patterns observed during processing—for example, if the proportion of "relevant" LLRs that indicate relevant LRs is far higher than expected (e.g. above 75% or 3% depending on the query context), or if all responses appear clustered within a single endpoint metadata class, such as operating system version of system language. In such cases, the Batch Abnormality Detector 220 may suppress confirmations temporarily or halt them entirely, depending on system configuration. In some examples, an abnormal classification may also result in immediate batch termination and/or query termination—particularly when the query's classification (via Query Context/Category 206) or operational safeguards indicate that continued processing would yield diminishing or misleading results. However, in general, if the batch is flagged as abnormal, analysts or automation systems may still intervene—using the override mechanism described earlier—to confirm one or more LRs and decide whether to manually terminate the batch and/or query or continue the batch in alignment after LRs confirmation analysis.

This separation of concerns—between termination control (e.g., BTC, QTC) and statistical behaviour (e.g., abnormal batch detection)—allows the system to maintain high-performance coordination while minimizing false positives, redundant data transfer, or unintended overload. It also supports flexible handling of edge conditions, including those caused by human error—such as misconfigured queries that elicit uniform or excessive responses—without compromising batch lifecycle integrity. This mechanism acts as a safeguard, helping to prevent unnecessary endpoint interrogation and avoid the accumulation of irrelevant data.

The system evaluates whether the overall QTC has been satisfied and proceed accordingly (313 through 315). The QTC defines the rule used to determine whether sufficient evidence has been accumulated—across one or more batch cycles—to complete processing of the current query. This evaluation is performed using the relevant logic from the Query Manager 102, and the set of stored local results (LRs) maintained by the Result Manager 108.

In some examples, the QTC may be satisfied once the system detects that specific criteria have been met as explained above—for example, that enough unique indicators have been found, that required coverage across key metadata attributes (e.g., region, OS type, time span) has been achieved, or that match rates have stabilized across recent batches.

If the QTC is satisfied, the system triggers a completion process (317), transitions to a query completion state and may optionally trigger one or more downstream workflows, including but not limited to alert generation, logging, reporting, or integration with external response or orchestration systems, as known in the art.

If the QTC is not yet satisfied, the system determines a new batch size—possibly using an updated scaling based on the scaling strategy (e.g. going back to block 303) —and begins another processing cycle by selecting a new subset of endpoints (as described above with respect to Selection Scheduler 214). This loop continues until the QTC is satisfied or until query execution is stooped by timeout conditions or manually stopped through policy constraints such as analyst input. Notably, the timeout used in the QTC is distinct from any timeout applied at the batch cycle level; the two operate independently and serve different control purposes.

In some examples, determining a new batch size and/or updating the batch scaling strategy (e.g., shifting between incremental, exponential, or hybrid modes) may take into account the size and composition of prior batches, the number of relevant responses received, and the degree of progress toward satisfying the QTC. As a non-limiting example, if the QTC requires 100 unique indicators and the first batch of 10,000 endpoints yields 1,000 relevant LLRs—but only 10 of them correspond to unique matches—the system may scale the next batch size aggressively, for instance multiplying by a factor of 5 or 10 (e.g., issuing to 100,000 endpoints), in order to increase the probability of discovering new results. If that second batch produces 90 new unique results, satisfying the QTC, the system transitions to query completion. But if the second batch largely overlaps with earlier findings, the system may either downscale (e.g., reduce batch size to 30,000 endpoints accompanied by rebalancing endpoint selection priorities—selecting underrepresented segments based on endpoint metadata such as region, operating system, etc. This may occur, for instance, if early batches were disproportionately filled by endpoints from a specific region or configuration class), or upscale further (e.g., to 1,000,000 endpoints) to broaden coverage in search of remaining signals.

The system may also react to sparse or low-frequency signal conditions—for example, if a batch of 20,000 endpoints yields only one relevant response. This pattern may indicate a rare or evasive threat type, such as dormant implants, or beaconing behaviour that manifests only on specific endpoint configurations. In such scenarios, the system may decide on more aggressive expansion (e.g., exponential growth), using multipliers such as 5×, or 10×.

In some examples, the decision-making process for scaling may be enhanced using machine learning models trained on historical batch cycle data. These models may learn from prior system behaviour, including factors such as batch size, scaling trajectory, signal density over time, endpoint participation rates, and the number of cycles required to satisfy past query termination conditions (QTCs). The models may also incorporate query classification metadata—such as whether the query is exploratory, high-confidence, time-sensitive, or coverage-driven—as defined by the Query Context/Category 206.

Based on these inputs, the model may estimate the expected contribution of future batches to overall QTC fulfilment. For instance, it may predict whether the next batch is likely to yield new unique indicators, fill remaining coverage gaps, or accelerate convergence. These predictions can guide the system in selecting an optimal scaling multiplier (e.g., 2×, 5×, 10×), deciding whether to prioritize broader exploration or focused exploitation, or identifying segments where additional confirmations are unlikely to add value. Notably, in some cases, the system may decide to maintain the same batch size as in the previous cycle (i.e., 1×).

In similar examples, machine learning models may be used also to predict other control variables across the query lifecycle. For instance, the model may directly suggest an optimal batch size, determine whether a specific class of endpoints should be included or excluded from future selection, or estimate the expected value of confirming a particular LLR based on partial metadata. In some implementations, ML outputs may influence early batch termination, adaptive suppression thresholds, or forecast whether the QTC is likely to be satisfied without additional cycles, or what type of LLR is required in a specific batch based on multi-phase LLR evaluation framework. These predictive adjustments are optional and may serve to optimize system efficiency, precision, or responsiveness under conditions of uncertainty.

These ML models may be trained on historical system data—including prior query outcomes, endpoint responsiveness, LLR match characteristics, batch-level statistical distributions, and QTC satisfaction timelines—to produce predictive signals that enhance decision quality under uncertainty.

For instance, the model may predict a batch size directly, rather than relying solely on heuristic scaling strategies. This prediction may take into account the size of prior batches, the rate of unique result acquisition, and diminishing returns trends. The output may be fed into the Size Estimator 212, which then applies the model's recommendation (e.g., "next batch: 30,000 endpoints") instead of—or in combination with—static policies.

In addition, the model may assist the Selection Scheduler 214 by identifying endpoint subgroups that are more or less likely to contribute relevant results. For example, based on prior cycles, the model may predict that certain geographic regions or device types are statistically saturated or unlikely to yield new signal, and recommend deprioritizing those endpoints in future batch cycles. This allows the selection logic to dynamically rebalance toward underrepresented segments or high-value predictors, such as endpoints in emerging risk zones.

In some examples, the model may further assist the system in evaluating whether a batch or even an entire query is likely to yield additional value if continued. This includes for example, early prediction of QTC fulfilment based on convergence trends, or unique match saturation. The model's output may be used by the Query Manager 102 to initiate query completion or downscale future expansion earlier than would otherwise occur using static thresholds alone.

All such uses of machine learning models are optional and may serve to complement static policies, rule-based decision trees, or analyst-defined parameters. One or more ML models—such as artificial neural networks (ANNs), including lightweight task-specific models or larger, general-purpose models—may be employed depending on the nature of the task, operational experience, or historical performance. The system may combine model predictions with traditional logic to balance efficiency, precision, and responsiveness in a way that aligns with the classification and intent of each query.

Beyond initial storage, the system may be further configured to support a range of centralized operations over the accumulated local results (LRs). These operations may be performed by downstream components or analyst-facing applications connected to the Result Manager 108. In some examples, stored LRs are aggregated, indexed, and normalized via the Result Aggregator 230 and persisted using the Interface 160. Once indexed, various operations can be performed on the LR dataset, including for example filtering, querying, or correlation across batch cycles, endpoint groups, or time windows, to identify cross-endpoint indicators, detect repeated patterns, or build an evolving view of system-wide exposure. These centralized capabilities may also support downstream workflows such as automated alerting, forensic analysis, compliance reporting, or training data generation for machine learning models. In some cases, query-metadata—such as batch ID, endpoint role, or timestamp, query context, query category—may be used to join LRs with external telemetry sources to enrich context-aware investigation.

In some examples, the system may be configured to retrieve not only targeted local results (LRs), but also the full local database—or a defined subset thereof—from one or more selected endpoints. This behaviour may be triggered for example, under specific conditions, such as when a retrieved LR exhibits high match density (e.g., more than a predefined number of unique files or correlated artifacts), when the result meets a policy-defined severity level, and/or when the query classification (as maintained by Query Category/Context module 206) authorizes escalation. In other examples, a full-database retrieval may be initiated manually by an analyst via Interface 160—for example, in response to an anomalous correlation pattern, a need to close visibility gaps, or when the analyst determines that a particular endpoint might soon shut down or become unreachable and that retrieving its full database would provide valuable context for investigation.

Unlike conventional EDR systems that continuously stream large volumes of (possibly filtered) endpoint telemetry to a centralized location, the present system is designed to remain lightweight and scalable at the global level. By combining LLR, confirmed LRs, and selective full-database retrieval only when needed, the system enables efficient operation across hundreds of millions of endpoints. This hybrid approach allows the system to retain flexibility without incurring unnecessary bandwidth, storage, processing or privacy burdens.

Conventional endpoint detection and response (EDR) systems rely on centralized telemetry collection. Each endpoint streams daily telemetry—often several megabytes—into a backend that retains a large historical window (e.g., 90 days). With tens or hundreds of thousands of endpoints, this can result in tens of terabytes of stored data. To answer a query, the system must scan the entire dataset, even if only a few endpoints are relevant. While this provides full visibility, it also leads to significant costs in storage, computing, and query latency, all of which grow with total data volume rather than the actual relevance of the data.

These challenges become more severe when scaling to larger environments. To send the same query to millions—or hundreds of millions—of endpoints, a centralized model would require indexing and scanning petabytes of telemetry. The infrastructure demands for compute, storage, and I/O grow accordingly, often pushing beyond practical operational limits. The system retains visibility but struggles to answer focused investigative questions efficiently as scale increases.

By contrast, the system described here distributes query evaluation to the endpoints themselves. Each device searches for its locally retained telemetry data (e.g., 90 days' worth) and returns a lightweight result (LLR) only if a match is found. Confirmed endpoints may then be instructed to transmit full results (LRs). Because the system processes only LLRs and selectively requested LRs, the total processing and data transfer footprint remains controlled—even as the number of endpoints grows from thousands to millions or more. The system maintains its performance characteristics across these scales.

The conventional centralized EDR and distributed EDR disclosed herein—serve different purposes and can coexist. For example, in enterprise settings, the system described herein can enhance the reach and precision of existing security operations. In non-enterprise or hybrid deployments, it enables a level of investigative capability that would otherwise be unattainable.

Examples demonstrating the operations of the system are provided herein below. For the sake of brevity, the entire workflow is not re-elaborated in the following non-limiting examples. Instead, illustrative scenarios are presented to highlight specific technical challenges encountered by cyber analysts and how they are addressed according to the presently disclosed subject matter.

As modern cyber threats become increasingly sophisticated and evasive, it becomes extremely difficult—if not impossible—to craft "bulletproof" queries, i.e., static expressions that reliably detect malicious behavior across all contexts without producing excessive noise or blind spots. The system described herein enables analysts to iteratively refine queries, investigate ambiguous signals, and scale their efforts, all without overwhelming infrastructure or compromising endpoint privacy.

As a non-limiting example, consider a scenario in which a security analyst issues a query targeting a rare, high-risk behavior—such as COM Hijacking initiated by untrusted operations—across a decentralized endpoint fleet comprising 20 million addressable endpoints. Initially, the system applies the query to a first batch of 50,000 endpoints.

Contrary to expectations, the system receives LLRs from approximately 85% of the batch, indicating relevance. This response pattern suggests either query misconfiguration. In response, the system classifies the batch as abnormal and suppresses further confirmations to prevent collection of LRs. The security analyst refines the query logic and re-submits the query (this refinement process might take a few iterations). The revised query is issued to a new batch of 50,000 endpoints (e.g. not necessarily the exact same 50,000), resulting in a match rate of just 0.001%—consistent with the rarity range of the target behaviour (as initially expected). The system then initiates exponential batch scaling via the Size Estimator (e.g., element 212), expanding the query to subsequent batches of 250K, 1 M, and 5 M EPs respectively. Upon evaluating LLRs from 5 M EPs, the system confirms 1 k, 2 k and 50 k relevant LRs, until reaching 5 unique indicators, thereby satisfying the QTC. The SOC engineer will process the query results and will form new rules to protect against the new revealed attack indicators, the system than updates the entire 20 M fleet local EDR agents with a new rule protecting against the new revealed indicators. Absent the system's staged response architecture—including the use of LLRs, confirmation gating, and dynamic batch scaling—the above process would have either (i) resulted in unnecessary transmission and processing of millions of results (that might be unfeasible), or (ii) failed to detect the relevant threat signal within an operationally acceptable time frame. By contrast, the present architecture enables non-disruptive recovery from abnormal batches, precise threat isolation, and rapid signal amplification across large populations—supporting advanced threat detection workflows in dynamic and evasive adversarial conditions.

As another non-limiting example, consider a security researcher operating across a globally distributed population of 100 million EPs, encompassing a wide diversity of hardware. The researcher seeks to identify signs of previously undetected malware based on a set of hypothesized indicators of compromise (IOCs). To initiate the investigation, the researcher submits a query constrained to a specific time window, such as endpoint activity logs from the past 7 days. The researcher also requests to get the full database (DB) of EPs that show unique attack indicators. QTC is defined to stop after having at least 1,000 accepted LLR with at least 30 unique indicators and time execution of up to 5 minutes. The query is distributed in staged batches to the global fleet, beginning with an initial batch of 50,000 endpoints and gradually growing the baches size according to actual results compared to the requested results defined in the QTC eventually ending after 500,000 EPs running the query. In response, the system receives approximately 1,200 LLRs indicating potential relevance. Following LLR evaluation, the system confirms a corresponding set of 1,200 LRs and identifies 50 unique attacks, for those, the LLR responded with a request to receive the full DB.

These 50 endpoints are selected for deeper inspection. At this stage, the researcher decides to manually investigate the compromised EPs and selects the EPs that successfully reported their DBs back for deep investigation and exploration of the EPs data. The full local databases that were made available to the researcher for centralized analysis by the query—supporting iterative query refinement, correlation across attributes, and deeper behavioral investigation under complete local context. In this scenario, the system avoids generating a massive amount of noise by focusing only on 50 full local databases, selected from a 500K endpoint batch within a 100 M fleet.

The following provides examples of the types of security-related events, endpoint metadata, query metadata, and centralized operations supported by the system.

Security-Related Events and Behaviours: The system may query locally stored data related to process activity, network traffic, file operations, registry edits, and service transitions. Process events may include creation, termination, and execution, with data such as process IDs, parent-child relationships, executable file locations, and cryptographic hashes. Network logging may capture inbound and outbound connections, including source and destination IP addresses and ports. File operation tracking may include access, modification, and creation metadata, along with file paths, hashes, and digital signature data. Registry modification logs may detect configuration changes, software installations, or persistence mechanisms. Service state transitions may capture changes to OS services, such as Windows service status. Queries may detect credential dumping (e.g., accessing credential storage paths or invoking credential-theft utilities), persistence (e.g., anomalies in scheduled tasks, registry autostarts, or startup folder use), privilege escalation (e.g., token manipulation or unauthorized elevation), script execution (e.g., PowerShell use from suspicious locations or with obfuscation), anti-forensic behaviour (e.g., file deletion or access to forensic logs), lateral movement (e.g., unauthorized remote executions or atypical logins), and data exfiltration (e.g., outbound file transfers via non-standard or obfuscated protocols).

Endpoint Metadata: Endpoint metadata may include OS type and version (e.g., Windows 11 build 22621.x), uptime, CPU model and architecture (e.g., Intel-specific or AMD-specific), and memory size. Network metadata may include current and public IP addresses to support segmentation by geography or VPN. Security posture indicators may include EDR or antivirus status (enabled or disabled), installed EDR agent version, and session integrity level. Detection history may include recent detection counts or time since last detection. User and session data (non-personalized) may indicate login state and anonymized session identifiers. Additional metadata may include installed frameworks or software stacks (e.g., .NET, SDKs), presence of tools like PowerShell or WMI, time zone expressed as UTC offset, and custom flags such as high-risk designation, lab device tag, or remote worker classification.

Query Metadata: Each query may include a unique query ID, version indicator for batch comparison, and an anonymized endpoint ID (e.g., hashed UUID). Performance telemetry may include execution duration in milliseconds, network I/O, peak and average CPU usage, peak RAM usage, and disk read/write volume in megabytes. Result statistics may include the number of rows returned and result set size in bytes, kilobytes, or megabytes. Execution status may indicate success, partial success, or error, and include associated codes, warnings, timeout, or cancellation indicators.

Centralized Operations: After collecting LLRs or LRs, centralized analysis may include record limiting, counting, summing, averaging, min/max calculations, medians, percentiles, filtering, and deduplication. Top-K queries may retrieve the highest-ranked records by numeric field. Grouping within time windows may support summaries and trend analysis. Relational operations may include joins with enrichment data or LRs from other queries, grouping by attributes like region, device type, or behaviour, and merging response sets across batches. Deduplication may remove structural duplicates while preserving endpoint attribution. These operations support statistical analysis and correlation without requiring full telemetry centralization.

Unless specifically stated otherwise, as apparent from the above discussions, it is appreciated that throughout the specification discussions utilizing terms such as "obtaining", "determining", "transmitting", "processing", "receiving", "evaluating", "triggering" or the like, refer to the action(s) and/or process(es) of a computer that manipulate and/or transform data into other data, said data represented as physical, such as electronic, quantities and/or said data representing the physical objects.

The term "end point", "computer", "system", "computer system", "computer device", "computerized device", "endpoint" or the like, should be expansively construed to cover any kind of hardware-based electronic device with one or more data processing circuitries. A processing circuitry can comprise, for example, one or more processors operatively connected to computer memory of any suitable sort, loaded with executable instructions for executing operations, as further described below. The one or more processors referred to herein can represent, for example, one or more general-purpose processing devices such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a graphics processing unit (GPU), a network processor, or the like. By way of non-limiting example, computerized systems or devices can include EDR system 100, end points 130*a* to 130N, disclosed in the present application.

The operations in accordance with the teachings herein may be performed by a computer specially constructed for the desired purposes or by a general-purpose computer specially configured for the desired purpose by a computer program stored in a non-transitory computer-readable storage medium.

As used herein, the phrase "for example," "such as", "for instance" and variants thereof, describe non-limiting embodiments of the presently disclosed subject matter. Reference in the specification to "one case", "some cases", "other cases", or variants thereof, means that a particular feature, structure, or characteristic described in connection with the embodiment(s), is included in at least one embodiment of the presently disclosed subject matter. Thus, the appearance of the phrase "one case", "some cases", "other cases", or variants thereof, does not necessarily refer to the same embodiment(s).

It is appreciated that certain features of the presently disclosed subject matter, which are, for clarity, described in the context of separate examples, may also be provided in combination in a single embodiment. Conversely, various features of the presently disclosed subject matter, which are, for brevity, described in the context of a single example, may also be provided separately or in any suitable sub-combination.

It should be noted that elements in FIGS. 1, 2A, and 2B can be made up of various combinations of software and hardware and/or firmware that performs the functions as defined and explained herein. Elements in FIGS. 1, 2A, and 2B may be centralized in one location or dispersed over more than one location. For example, each one of elements shown can be located at a different geographical location, remote from the other elements. Furthermore, in some examples of the presently disclosed subject matter, the system 100 may comprise fewer, more, and/or different elements than those shown in FIGS. 1, 2A, and 2B, however it will be clear to any person skilled in the art that the functionalities of the system can be otherwise divided.

It should be noted that the term "criterion" as used herein should be expansively construed to include any compound criterion, including, for example, several criteria and/or their logical combinations. Also, the specific examples of criteria should not be considered as limiting, and those skilled in the art will readily appreciate that the teachings of the presently disclosed subject matter are, likewise, applicable to other criteria.

In various examples of the presently disclosed subject matter, fewer, more, and/or different stages than those shown in FIG. 3 may be executed. In embodiments of the presently disclosed subject matter, one or more stages illustrated in the figures may be executed in a different order, and/or one or more groups of stages may be executed simultaneously.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention. It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer-implemented method of endpoint detection and response (EDR) across a plurality of endpoints (EPs), each storing local security-related event data in a local database, the method comprising:

(a) obtaining a query configured to identify at least one security-related event, and a query termination condition (QTC);

(b) determining a batch size specifying the number of EPs to include in a current batch cycle;

(c) transmitting the query to a batch of EPs selected to match the batch size;

(d) processing data associated with the batch of EPs until a batch termination condition (BTC) is met, including:

(i) receiving, from one or more EPs, a lightweight local response (LLR), the LLR indicating at least that a respective local result (LR), generated by applying the query to the endpoint's local database, is relevant;

(ii) transmitting confirmation to a subset of EPs whose LLRs satisfy a confirmation control condition (CCC) for LR retrieval;

(iii) receiving and storing the LR in a data storage;

(e) in response to the BTC being met:

(i) evaluating the QTC based at least on the stored LRs, wherein compliance with the QTC is data-dependent as it is evaluated based on information derived in real-time from the local responses as they are received;

(ii) when the QTC is not satisfied:

(1) determining a new batch size for a next batch cycle;

(2) repeating operations (c) through (e) within the next batch cycle;

(iii) otherwise, triggering a completion process dedicated to finalizing the query execution; thereby facilitating a decentralized EDR across a plurality of EPs.

2. The method of claim 1, wherein the BTC includes one or more of:

(i) receiving LLRs determined to be relevant from a predefined threshold proportion of the EPs in the batch of EPs;

(ii) reaching a predefined number of received LLRs; or (iii) expiration of a predefined timeout period.

3. The method of claim 1, further comprising: responsive to determining that the batch is abnormal, modifying the CCC to suppress confirmations for LR retrieval.

4. The method of claim 3 comprising:

classifying the batch as abnormal based on one or more of:

(i) detection of a deviation from a predefined threshold proportion of LLRs relative to the batch size;

(ii) detection of a deviation from an expected distribution of LLRs among the selected endpoints.

5. The method of claim 3 comprising: receiving a manual override of the suppression, and in response, enabling confirmation to one or more endpoints whose LLRs indicate potential relevance, to trigger targeted data retrieval.

6. The method of claim 1, wherein determining the new batch size comprises applying a scaling strategy that defines the manner in which the batch size is updated between batch cycles.

7. The method of claim 6, wherein the scaling strategy is selected from:

(a) incremental scaling strategy;

(b) exponential scaling strategy; or (c) hybrid scaling strategy;

wherein the system dynamically transitions between scaling strategies.

8. The method of claim 7, wherein the scaling strategy is selected based on one or more query-specific factors, including the query goal or context.

9. The method of claim 1, further comprising:

in response to the QTC not being satisfied, repeating selection of one or more endpoints to be included in the next batch cycle in accordance with the new batch size.

10. The method of claim 1, further comprising, selecting the batch of EPs according to one or more endpoint-metadata attributes.

11. The method of claim 1, further comprising, selecting the batch of EPs by way of random selection, the random selection being performed within, across, or independently of any endpoint-metadata attributes.

12. The method of claim 1, wherein one or more criteria used to evaluate whether a LLR satisfies a confirmation control condition (CCC) are encoded in a compact representation, the compact representation comprising one or more of: a binary indication of relevance, a numeric confidence score, a classification result, a hashed descriptor, or another data structure summarizing relevance signals.

13. The method of claim 1, further comprising: evaluating each received LLR in real time; determining on a per-endpoint basis whether the LLR satisfies a confirmation control condition (CCC); and wherein received LRs are made available for downstream processing prior to the completion of the current batch cycle.

14. The method of any claim 1, further comprising selectively retrieving full local database data from one or more EPs in the batch, in addition or instead of retrieving LRs.

15. The method of claim 1, wherein the QTC is determined as satisfied if accumulated stored LRs comply with at least one of:

(i) a predefined number of distinct responses attributes; and (ii) coverage across a predefined number of distinct endpoint metadata attributes.

16. The method of claim 15, wherein the QTC is determined as satisfied if at least one of the following is met in combination with clause (i) or (ii) of claim 15:

(i) a statistical condition computed over the stored local responses, including a convergence in match rate, or frequency distribution;

(ii) receiving relevant responses from a minimum number of distinct endpoints.

17. The method of claim 1, further comprising, terminating the query execution in response to expiration of a predefined timeout or a user-initiated interruption; wherein such termination does not constitute satisfaction of the QTC.

18. The method of claim 1, further comprising, dynamically modifying the CCC in real-time during execution of a current batch cycle or for a subsequent batch cycle based at least in part on the QTC.

19. The method of claim 18, wherein dynamically modifying the confirmation control condition (CCC) is done based on previously received LRs, to prioritize confirmations that are expected to contribute to satisfying the QTC, and to suppress confirmations from endpoints associated with endpoint-metadata attribute groups that have already sufficiently contributed to the QTC.

20. The method of claim 19, wherein the dynamic modification of the CCC includes excluding endpoints associated with one or more endpoint-metadata attribute groups that have already satisfied a QTC objective from selection in one or more subsequent batch cycles.

21. The method of claim 1, wherein each LLR is represented in a compact format selected from a single bit, a hashed descriptor, or any other compact format.

22. A computer system for endpoint detection and response (EDR) across a plurality of endpoints (EPs), each storing local security-related event data in a local database, the system comprising at least one processor and memory circuitry (PMC), and being communicatively connected to the plurality of endpoints via a network; the at least one PMC is configured to:

(a) obtain a query configured to identify at least one security-related event, and a query termination condition (QTC);

(b) determine a batch size specifying the number of EPs to include in a current batch cycle;

(c) transmit the query to a batch of EPs selected to match the batch size;

(d) process data associated with the batch of EPs until a batch termination condition (BTC) is met, including:

(i) receiving, from one or more EPs, a lightweight local response (LLR), the LLR indicating at least that a respective local result (LR), generated by applying the query to the endpoint's local database, is relevant;

(ii) transmitting confirmation to a subset of EPs whose LLRs satisfy a confirmation control condition (CCC) for LR retrieval;

(iii) receiving and storing the LR in a data storage;

(e) in response to the BTC being met:

(i) evaluating the QTC based at least on the stored LRs, wherein compliance with the QTC is data-dependent as it is evaluated based on information derived in real-time from the local responses as they are received;

(ii) when the QTC is not satisfied:

(1) determining a new batch size for a next batch cycle;

(2) repeating operations (c) through (e) within the next batch cycle;

(iii) otherwise, triggering a completion process dedicated to finalizing the query execution; thereby facilitating a decentralized EDR across a plurality of EPs.

23. The system of claim 22, wherein the at least one PMC is configured for determining the new batch size to apply a scaling strategy that defines the manner in which the batch size is updated between batch cycles.

24. The system of claim 23, wherein the scaling strategy applied by the PMC is selected from:

(a) an incremental scaling strategy;

(b) an exponential scaling strategy; or (c) a hybrid scaling strategy;

wherein the system is configured to dynamically transition between scaling strategies.

25. The system of claim 22, wherein the at least one PMC is configured to determine that the query termination condition (QTC) is satisfied if accumulated stored local results (LRs) comply with at least one of:

(i) a predefined number of distinct response attributes; and (ii) coverage across a predefined number of distinct endpoint-metadata attributes.

26. The system of claim 22, wherein the at least one PMC is configured to dynamically modify a confirmation control condition (CCC) in real time during execution of a current batch cycle or for a subsequent batch cycle based at least in part on the query termination condition (QTC).

27. The system of claim 26, wherein the at least one PMC is configured to modify the confirmation control condition (CCC) based on previously received local results (LRs) to prioritize confirmations expected to contribute to satisfying the QTC and to suppress confirmations from endpoints associated with endpoint-metadata attribute groups that have already sufficiently contributed to the QTC.

28. A non-transitory computer-readable storage medium comprising instructions that, when executed by a computer, cause the computer to perform a method of endpoint detection and response (EDR) across a plurality of endpoints (EPs), each storing local security-related event data in a local database, the method comprising:

(a) obtaining a query configured to identify at least one security-related event, and a query termination condition (QTC);

(b) determining a batch size specifying the number of EPs to include in a current batch cycle;

(c) transmitting the query to a batch of EPs selected to match the batch size;

(d) processing data associated with the batch of EPs until a batch termination condition (BTC) is met, including:

(i) receiving, from one or more EPs, a lightweight local response (LLR), the LLR indicating at least that a respective local result (LR), generated by applying the query to the endpoint's local database, is relevant;

(ii) transmitting confirmation to a subset of EPs whose LLRs satisfy a confirmation control condition (CCC) for LR retrieval;

(iii) receiving and storing the LR in a data storage;

(e) in response to the BTC being met:

(i) evaluating the QTC based at least on the stored LRs, wherein compliance with the QTC is data-dependent as it is evaluated based on information derived in real-time from the local responses as they are received;

(ii) when the QTC is not satisfied:

(1) determining a new batch size for a next batch cycle;

(2) repeating operations (c) through (e) within the next batch cycle;

(iii) otherwise, triggering a completion process dedicated to finalizing the query execution;

thereby facilitating a decentralized EDR across a plurality of EPs.

29. The non-transitory computer-readable storage medium of claim 28, wherein the method comprises:

(f) dynamically modifying a confirmation control condition (CCC) in real time during execution of a current batch cycle or for a subsequent batch cycle, based at least in part on a query termination condition (QTC).

30. A distributed computer system for decentralized endpoint detection and response (EDR), the system comprising:

a central system comprising processor and memory circuitry (PMC);

a plurality of endpoints (EPs), each EP comprising PMC and a local database storing security-related event data;

a communication network operatively connecting the central system and the plurality of endpoints;

wherein the central system is configured to:

(a) obtain a query configured to identify at least one security-related event, and a query termination condition (QTC);

(b) determine a batch size specifying the number of EPs to include in a current batch cycle;

(c) transmit the query to a batch of EPs selected to match the batch size;

and wherein each of the plurality of endpoints is configured to:

receive the query;

apply the query to the local database to generate a local result (LR);

evaluate the LR to determine whether it satisfies a relevance criterion associated with the query;

in response to determining that the LR satisfies the relevance criterion, generate a lightweight local response (LLR) indicative of the relevance of the LR to the query;

transmit the LLR to the central system;

wherein the central system is further configured to:

(d)(i) receive the LLR from one or more of the plurality of EPs;

(d)(ii) evaluate each LLR against a confirmation control condition (CCC);

(d)(iii) transmit confirmation to a subset of EPs whose LLRs satisfy the CCC;

and wherein each EP in the subset of EPs is further configured to:

responsive to receiving a confirmation, transmit the LR to the central system;

wherein the central system is further configured to:

(e) in response to a batch termination condition (BTC) being met:

(e)(i) evaluate the QTC based at least on the stored LRs, wherein compliance with the QTC is data-dependent as it is evaluated based on information derived in real-time from the local responses as they are received;

(e)(ii) if the QTC is not satisfied:

(1) determine a new batch size for a next batch cycle;

(2) repeat operations (c) through (e);

(ii) otherwise, trigger a completion process dedicated to finalizing the query execution;

thereby enabling distributed, relevance-driven query execution and selective data retrieval across the plurality of endpoints.

* * * * *